United States Patent
Mehta et al.

(10) Patent No.: US 10,972,934 B2
(45) Date of Patent: *Apr. 6, 2021

(54) END-TO-END PRIORITIZATION FOR MOBILE BASE STATION

(71) Applicant: Parallel Wireless, Inc., Nashua, NH (US)

(72) Inventors: Pratik Vinod Mehta, Pune (IN); Yang Cao, Westford, MA (US); Sumit Garg, Hudson, NH (US); Kaitki Agarwal, Westford, MA (US); Rajesh Kumar Mishra, Westford, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/460,162

(22) Filed: Jul. 2, 2019

(65) Prior Publication Data

US 2019/0380061 A1 Dec. 12, 2019

Related U.S. Application Data

(63) Continuation of application No. 15/607,425, filed on May 26, 2017, now Pat. No. 10,341,898.
(Continued)

(51) Int. Cl.
*H04L 12/46* (2006.01)
*H04L 12/801* (2013.01)
(Continued)

(52) U.S. Cl.
CPC ..... *H04W 28/0268* (2013.01); *H04L 12/4633* (2013.01); *H04L 47/18* (2013.01);
(Continued)

(58) Field of Classification Search
CPC ............ G06F 9/45533–45558; G06F 2009/45562–45595; H04B 7/02–026;
(Continued)

(56) References Cited

U.S. PATENT DOCUMENTS

10,341,898 B2* 7/2019 Mehta ............... H04W 28/0268
2011/0170411 A1 7/2011 Wang et al.
(Continued)

*Primary Examiner* — Timothy J Weidner
(74) *Attorney, Agent, or Firm* — Michael Y. Saji; David W. Rouille (57) ABSTRACT

A method for utilizing quality of service information in a network with tunneled backhaul is disclosed, comprising: establishing a backhaul bearer at a base station with a first core network, the backhaul bearer established by a backhaul user equipment (UE) at the base station, the backhaul bearer having a single priority parameter, the backhaul bearer terminating at a first packet data network gateway in the first core network; establishing an encrypted internet protocol (IP) tunnel between the base station and a coordinating gateway in communication with the first core network and a second core network; facilitating, for at least one UE attached at the base station, establishment of a plurality of UE data bearers encapsulated in the secure IP tunnel, each with their own QCI; and transmitting prioritized data of the plurality of UE data bearers via the backhaul bearer and the coordinating gateway to the second core network.

18 Claims, 6 Drawing Sheets

Related U.S. Application Data (60) Provisional application No. 62/342,001, filed on May 26, 2016.

(51) Int. Cl.
*H04L 12/851* (2013.01)
*H04W 28/02* (2009.01)
*H04W 28/10* (2009.01)
*H04W 40/12* (2009.01)
*H04W 40/22* (2009.01)
*H04W 76/12* (2018.01)
*H04W 76/15* (2018.01)
*H04W 92/04* (2009.01)

(52) U.S. Cl.
CPC ............ *H04L 47/24* (2013.01); *H04L 47/245* (2013.01); *H04W 28/0252* (2013.01); *H04W 28/0284* (2013.01); *H04W 28/10* (2013.01); *H04W 40/12* (2013.01); *H04W 40/22* (2013.01); *H04W 76/12* (2018.02); *H04W 76/15* (2018.02); *H04W 92/045* (2013.01)

(58) Field of Classification Search
CPC .. H04B 7/14–15592; H04L 5/0001–26; H04L 12/4633; H04L 12/28; H04L 12/56; H04L 29/06027; H04L 47/10; H04L 47/18; H04L 47/24–2491; H04L 47/805; H04Q 11/0478; H04W 8/005–30; H04W 12/02–12; H04W 16/02–16; H04W 24/02–10; H04W 28/02–26; H04W 36/12; H04W 36/385; H04W 40/02; H04W 40/12; H04W 40/22–38; H04W 56/0005–0025; H04W 72/0406–1273; H04W 72/14; H04W 76/10–50; H04W 80/08–12; H04W 84/005–22; H04W 88/005; H04W 88/08–188; H04W 92/02–24

See application file for complete search history.

(56) References Cited

U.S. PATENT DOCUMENTS

| | | |
|---|---|---|
| 2014/0226482 A1 | 8/2014 | Lv |
| 2015/0110044 A1 | 4/2015 | Berzin et al. |
| 2015/0173111 A1 | 6/2015 | Agarwal et al. |
| 2015/0304882 A1 | 10/2015 | Turanyi et al. |
| 2016/0135107 A1* | 5/2016 | Hampel ............ H04W 28/0252 |
| 2018/0367569 A1 | 12/2018 | Verma et al. |
| 2020/0196183 A1* | 6/2020 | Mehta ............... H04W 28/0268 |

* cited by examiner

END-TO-END PRIORITIZATION FOR MOBILE BASE STATION

CROSS-REFERENCE TO RELATED APPLICATIONS

This application is a continuation of, and claims the benefit of priority under 35 U.S.C. § 120 of U.S. patent application Ser. No. 15/607,425, titled "End-to-End Prioritization for Mobile Base Station", and filed May 26, 2017, which itself claims the benefit under 35 U.S.C. § 119(e) of U.S. Provisional Patent Application No. 62/342,001, which is hereby incorporated by reference herein in its entirety for all purposes. This application also hereby incorporates by reference for all purposes the following documents: IETF RFC 2474; IETF RFC 2475; IETF RFC 3260; IETF RFC 4727; 3GPP TS 23.401; 3GPP TS 24.301; 3GPP TS 24.008; US20150092688; US20140192643; WO2013145592A1; US20150009822; US20140086120; US20140133456; US20140233412; US20150078167; US20150257051.

BACKGROUND

It is possible to create an LTE network where certain base stations are backhauled using a wireless, LTE-based connection. For example, U.S. Pat. App. No. 20140233412, which is hereby incorporated by reference herein in its entirety, describes a network suitable for use by public safety personnel that uses mobile base stations equipped with LTE backhaul modules that establish encrypted LTE backhaul connections to provide voice, data, and multimedia services. Tunneled backhaul is particularly useful for mobile base stations, as mobile base stations are by definition mobile and do not have access in all cases to wired backhaul. Instead they may depend on the ability to utilize wireless backhaul connections over, e.g., Wi-Fi, 3G, LTE, or other wireless protocols.

LTE has two QOS mechanisms, including the Quality of Service Class Indicator (QCI) and Allocation Retention Priority (ARP), that operate on the level of a specific individual packet connection between a user equipment (UE) and a core network, e.g., an Evolved Packet System (EPS) bearer.

The QoS Class Identifier (QCI) controls packet forwarding treatment (e.g. scheduling weights, admission thresholds, queue management thresholds, link layer protocol configuration, etc.), and is typically pre-configured by the network operator. QCI is a scalar associated with an EPS bearer and used as a reference by various bearer-level packet forwarding treatments and filters. These filters indicate the type of flow, e.g., voice, general IP packet data, or media-based IP packet data. A mobile network operator uses the QCI of each bearer to determine what type of treatment is required for the bearer; this is often performed in an IP-based network by translating QCI to another IP-based QOS tagging scheme, such as IP Differentiated Services (Diff-Serv) code points (DSCPs), detailed in IETF RFC 2474, which can be provided different levels of service within the network.

ARP is also associated with an EPS bearer, as is QCI. ARP contains information about the priority level, preemption capability, and preemption vulnerability. The primary purpose of ARP is to decide whether a bearer establishment or modification request can be accepted or needs to be rejected due to resource limitations. The ARP value can be used to cause a certain bearer to be terminated (preempted) to permit a higher-priority bearer with a higher-priority ARP value to be established. ARP can be part of the subscriber profile which is retrieved from the HSS. Further information about QCI and ARP appears in 3GPP TS 23.401.

Often, operators use the PGW to map traffic onto EPC bearers with associated QCIs, which are mapped to DiffServ classes, and marks IP headers of the packets to reflect these priorities. During congestion, core and backhaul routers drop packets according to non-3GPP rules, such as according to DSCP diffserv code points.

SUMMARY

A method may be disclosed for some embodiments, comprising: establishing a backhaul bearer at a base station with a first core network, the backhaul bearer established by a backhaul user equipment (UE) at the base station, the backhaul bearer having a single priority parameter, the backhaul bearer terminating at a first packet data network gateway in the first core network; establishing an encrypted internet protocol (IP) tunnel between the base station and a coordinating gateway in communication with the first core network and a second core network; facilitating, for at least one UE attached at the base station, establishment of a plurality of UE data bearers encapsulated in the secure IP tunnel, the plurality of UE data bearers terminating at a second packet data network gateway in the second core network and having a plurality of individual priority parameters for prioritized traffic control at the second core network; and transmitting prioritized data of the plurality of UE data bearers via the backhaul bearer and the coordinating gateway to the second core network.

The backhaul bearer may be a dedicated bearer, the single priority parameter may be a quality of service class indicator (QCI) parameter, and the plurality of individual priority parameters may each be QCI parameters. The method may further comprise establishing a second backhaul bearer at the base station having a second QCI parameter, where the first backhaul bearer may be a dedicated bearer to be used for prioritized traffic, and the second backhaul bearer may be a default bearer to be used for non-prioritized traffic. At least one of the backhaul bearer and the plurality of UE data bearers may be 3G packet data protocol (PDP) contexts. The backhaul bearer may be a dedicated non-guaranteed bit rate (non-GBR) bearer with an allocation retention priority (ARP) parameter. The backhaul bearer may be a dedicated non-guaranteed bit rate (non-GBR) bearer with a quality of service class identifier (QCI) parameter of 6 and an allocation retention priority (ARP) parameter of 1; The backhaul bearer may be a GBR bearer with an ARP parameter of 6; or The backhaul bearer may be a GBR bearer with an ARP parameter of 1. The method may further comprise establishing a second backhaul bearer at the base station having a second QCI parameter, where the first backhaul bearer may be a guaranteed bit rate (GBR) bearer and the second backhaul bearer may be a non-GBR bearer. The base station may have a UE modem with an associated subscriber information module (SIM) card configured for use with the first core network.

The method may further comprise receiving, at the coordinating gateway, uplink UE data from the UE on one of the plurality of UE data bearers; identifying, at the coordinating gateway, a filter template for the uplink UE data based on a priority parameter associated with the one of the plurality of UE data bearers; and applying, at the coordinating gateway, the filter template to the uplink UE data to create an IP flow with a quality of service parameter based on the priority parameter. The priority parameter may be a quality of service class identifier (QCI) and the priority parameter may be one of a differentiated services code point (DSCP) or IPv4 type of service (TOS) IP envelope tag.

The method may further comprise receiving, at the coordinating gateway, a downlink IP flow from the second packet data network gateway (PGW); identifying, at the coordinating gateway, a filter template to the downlink IP flow based on a parameter; and applying, at the coordinating gateway, the filter template to the downlink IP flow to cause the downlink IP flow to be mapped to one of the plurality of UE data bearers as a selected UE data bearer with an associated quality of service class identifier (QCI).

The filter template may be a traffic filter template (TFT). The downlink IP flow may be tagged with differentiated services code point (DSCP) or IPv4 type of service (TOS) tagging, and the DSCP or TOS tagging may be the parameter. The parameter may be one or more of a source or destination IP address, a protocol identifier, a local or remote port range, or an IP packet envelope field. The selected UE data bearer may be a dedicated bearer or a default bearer. The selected UE data bearer may be a guaranteed bit rate (GBR) bearer or a non-GBR bearer. The selected UE data bearer may be further characterized by an associated allocation retention priority (ARP) parameter. The downlink IP flow may be a conversational voice IP flow, and the associated QCI of the selected UE data bearer may be 1. The downlink IP flow may be a mission critical data flow, and the associated QCI of the selected UE data bearer may be 65 or 69. The source IP address or source IP port of the IP flow may be configured to cause the coordinating gateway to select a particular filter template appropriate to a type of traffic of the downlink IP flow.

DETAILED DESCRIPTION

1. Introduction

LTE and other wireless networks distinguish between Guaranteed Bit Rate (GBR) and non-GBR connections. GBR requires a higher degree of resources, as the resources are intended to be readily available whenever requested by the connection holder. In some embodiments, GBR, specified GBR, and maximum bit rate (MBR) may be interchanged (currently MBR=GBR in the 3GPP standards). GBR connections have associated ARP and QCI, and will not experience congestion-related packet loss, provided that the user traffic is compliant to the agreed GBR QoS parameters.

GBR connections may be established on demand because it allocates transmission resources by reserving them during the admission control function. GBR bearers prefer precedence of service blocking over service dropping in congestion situation. Inactivity timers are used to control air interface and S1 interface to free up resources.

By contrast, non-Guaranteed Bit Rate (Non-GBR) bearers may have a Maximum Bit Rate (MBR); also have associated ARP and QCI. Service must be prepared to experience congestion-related packet loss. Non-GBR connections can remain established for long periods of time because they do not reserve transmission resources. They exhibit a preference for service dropping over service blocking in congestion situations. Aggregate Maximum Bit Rate (AMBR) is a number that sums all non-GBR bearers per terminal/Access Point Name (APN).

TABLE 1 shows how the 3GPP standard QCI parameter relates to GBR/non-GBR resource types and example services.

TABLE 1

| QCI | Resource Type | Priority Level | Packet Delay Budget | Packet Error Loss Rate (NOTE 2) | Example Services |
|---|---|---|---|---|---|
| 1 (NOTE 3) | GBR | 2 | 100 ms (NOTE 1, NOTE 11) | $10^{-2}$ | Conversational Voice |
| 2 (NOTE 3) | | 4 | 150 ms (NOTE 1, NOTE 11) | $10^{-3}$ | Conversational Video (Live Straming) |
| 3 (NOTE 3) | | 3 | 50 ms (NOTE 1, NOTE 11) | $10^{-3}$ | Real Time Gaming |
| 4 (NOTE 3) | | 5 | 300 ms (NOTE 1, NOTE 11) | $10^{-6}$ | Non-Conversational Video (Buffered Streaming) |
| 65 (NOTE 3, NOTE 9, NOTE 12) | | 0.7 | 75 ms (NOTE 7, NOTE 8) | $10^{-2}$ | Mission Critical user plane Push To Talk voice (e.g., MCPTT) |
| 66 (NOTE 3, NOTE 12) | | 2 | 100 ms (NOTE 1, NOTE 10) | $10^{-2}$ | Non-Mission-Critical user plane Push To Talk voice |
| 5 (NOTE 3) | Non-GBR | 1 | 100 ms (NOTE 1, NOTE 10) | $10^{-6}$ | IMS Signaling |

TABLE 1-continued

| QCI | Resource Type | Priority Level | Packet Delay Budget | Packet Error Loss Rate (NOTE 2) | Example Services |
|---|---|---|---|---|---|
| 6 (NOTE 4) | | 6 | 300 ms (NOTE 1, NOTE 10) | $10^{-6}$ | Video (Buffered Streaming) TCP-based (e.g., www, e-mail, chat, ftp, p2p file sharing, progressive video, etc.) |
| 7 (NOTE 3) | | 7 | 100 ms (NOTE 1, NOTE 10) | $10^{-3}$ | Voice, Video (Live Streaming) Interactive Gaming |
| 8 (NOTE 5) | | 8 | 300 ms (NOTE 1) | $10^{-6}$ | Video (Buffered Streaming) TCP-based (e.g., www, e-mail, chat ftp, p2p file sharing, progressive video, etc.) |
| 9 (NOTE 6) | | 9 | | | |
| 69 (NOTE 3, NOTE 9, NOTE 12) | | 0.5 | 60 ms (NOTE 7, NOTE 8) | $10^{-6}$ | Mission Critical delay sensitive signalling (e.g., MC-PTT signalling) |
| 70 (NOTE 4, NOTE 12) | | 5.5 | 200 ms (NOTE 7, NOTE 10) | $10^{-6}$ | Mission Critical Data (e.g. example services are the same as QCI 6/8/9) |

Turning to ARP, the QoS parameter ARP contains information about the priority level, the pre-emption capability and the pre-emption vulnerability. The priority level defines the relative importance of a resource request. This allows deciding whether a bearer establishment or modification request can be accepted or needs to be rejected in case of resource limitations (typically used for admission control of GBR traffic). It can also be used to decide which existing bearers to pre-empt during resource limitations.

The range of ARP priority level is 1 to 15 and 1 as the highest level of priority. The pre-emption capability information defines whether a service data flow can get resources that were already assigned to another service data flow with a lower priority level. The pre-emption vulnerability information defines whether a service data flow can lose the resources assigned to it in order to admit a service data flow with higher priority level. The pre-emption capability and the pre-emption vulnerability can either be set to 'yes' or 'no'.

The ARP priority levels 1-8 should only be assigned to resources for services that are authorized to receive prioritized treatment within an operator domain (i.e. that are authorized by the serving network). ARP priority level 1-8 are intended to be used to indicate e.g. emergency and other priority services within an operator domain in a backward compatible manner. This does not prevent the use of ARP priority level 1-8 in roaming situation in case appropriate roaming agreements exist that ensure a compatible use of these priority levels. The ARP priority levels 9-15 may be assigned to resources that are authorized by the home network and thus applicable when the UE is roaming.

ARP is typically used for admission control at the eNodeB, and is typically not used by the eNodeB scheduler. The primary purpose of ARB is to decide if a bearer establishment/modification request can be accepted or rejected in case of resource limitation. ARP is stored in the Subscriber profile (HSS) on a per APN basis (at least one APN must be defined per subscriber) and consists of: a priority level of 1-15, with 1-8 intended for prioritized treatment within operator domain (per 3GPP 29.212, hereby incorporated by reference in its entirety, and in particular Section 5.3.45); a preemption capability flag; and a pre-emption vulnerability flag. NGN GETS recommends reserving 1 to 5 ARP levels in the range of 1-8 to represent the 5 NGN GETS priority levels. The pre-emption capability flag indicates that this bearer can pre-empt other users. The pre-emption vulnerability flag indicates that this bearer can be pre-empted by other users. ARP is used as follows. At every Radio Bearer (RB) setup request (including HO and RRC connection re-establishment), the eNodeB Radio Admission Control (RAC) entity checks the current eNodeB's ability to accept the request, considering factors such as: maximum numbers of UEs and RBs; number of RBs on GBR; and any hard capacity limits.

While LTE provides certain mechanisms as described above for providing quality of service (QOS), these QOS identifiers are often disregarded when the data packets reach the backhaul network. For example, a QCI parameter may be associated with an EPS bearer, but if the EPS bearer is encapsulated into a larger IP packet data flow, such as a single tunneled backhaul flow, it is difficult to ensure that the QCI of each bearer is propagated to the intermediary nodes in the network. Current methods do not fully address the needs of wireless backhaul links, which may transit multiple operator networks before reaching their "home" operator network; current methods also do not fully address the needs of public safety users, who may require priority service even across multiple operator core networks.

It is possible to use multiple forms of backhaul to connect to a core network from a base station, in some embodiments. Wired, LTE, microwave, satellite etc. In particular, in the specialized Parallel Wireless architecture, a base station communicates with a coordinating node located between the radio access network (RAN) and the core network. However, in the situation where a base station uses a wireless backhaul link that passes through another operator core network (i.e., not the home core network), communications from the base station to the coordinating node are tunneled through the other operator core network, and potentially the public Internet, before reaching the coordinating node and entering into an unencrypted home core network environment.

For LTE backhaul, the described base station has an onboard LTE modem, in some embodiments, which can attach to an existing LTE network and provide IP connectivity. Or it can use an external modem or modem bank for the same. The base station uses IPSec to secure its connectivity to the coordinating node. All signaling and data is encrypted when it leaves the coordinating node and base station. The base station and coordinating node together enable end-to-end QOS mechanisms for the various access technologies they support. E.g. for UMTS and LTE access, they provide differing treatment for different bearers. For Wi-Fi, they support different WMM profiles etc.

The underlying macro network too may support E2E QoS using different QCI. However when the base station uses the LTE backhaul, the end-to-end QOS considerations may not be met, since the underlying macro network cannot distinguish, and thus differentially treat, the traffic inside the encrypted tunnel.

As an example, consider the case of base station providing LTE access and using one LTE modem. The base station, or rather the backhaul UE, will appear as one UE to the network. In normal case, it will have one bearer and one QCI. This bearer and QCI may be associated with the IMSI of the backhaul UE. All data destined to and from the base station will use one bearer, get one QCI and thus get the same QOS treatment, when it transits the underlying LTE network, and this treatment may not be specially privileged but may instead be based on policies determined by the PCRF that are dependent on the specific backhaul UE. The figure below describes the scenario.

This will break the E2E QoS for the access LTE network. All delay critical or GBR QCIs shall get a non-GBR QCI 9 'generic background traffic' treatment. So will the base station-coordinating node signaling data, required to keep the cell up.

An example where this type of backhaul would be useful is in the scenario of a police car providing LTE access to users in its immediate vicinity via a mobile base station, and connecting via LTE backhaul via an existing operator LTE network. End-to-end QOS can thus enable critical voice communications, push-to-talk (PTT), etc. over the existing operator LTE network.

Various standard QOS tools are already available. For example, LTE permits QCI per application, and permits the creation of bearers with QCI=1 (GBR conversational voice). But GBR=1 is too costly to use for all traffic from the mobile base station. As another example, ARP could be used. However, ARP does not make sense for all traffic on the backhaul connection. As another example, a traffic flow template (TFT), such as a downlink TFT (DL-TFT), could be used. But traffic sent over a default bearer is not subject to TFTs in some cases.

2. Proposed Solutions

In some embodiments, a general solution is proposed, which involves the following: Create an N-to-M mapping of individual flows to LTE bearers using an arbitrary map, and using, e.g., QCI, ARP, TFT, DSCP, other flags to create that map and make some aspect of the QoS of the underlying flow visible as it is routed through different sections of the network (core network, Internet, operator network).

Different QCIs using multiple modems; Different QCIs with multiple PDN contexts on one modem; or Different QCIs with multiple bearers on one modem could be used.

For example, in some embodiments, at PCRF, install mapping of UEs/apps to QCI, DSCP; PCRF sends similar mappings as TFTs to PGW1 (please refer to FIG. 3); UE attaches; UE attach request can indicate the application being used; PCRF tags the UE with a particular QCI and DSCP; PGW1 marks DSCP=EF; Uplink: base station maps QCI to TOS; TOS mapped to bearer by modem; Downlink: Use coordinating gateway to enforce hierarchy because it knows that the backhaul UE is a special UE. This can be based on DSCP=EF; coordinating gateway sees DSCP, maps to TOS and sends back to PGW1 with TOS value in IP header; PGW enforces this TOS via TFT. TFT may only be available for dedicated bearer. This may involve some logic at PCRF, some logic at the coordinating node, and at the base station itself, in some embodiments.

In some embodiments, different QCIs are enabled on backhaul UE by creating and leveraging multiple special dedicated bearers on the backhaul UE. The coordinating node sets the outer IP header of the encrypted (ESP) packets such that application of DL-TFT by the backhaul UE's PDNGW (BH-PGW), will cause the different packets to map to different bearers and thus get relevant QoS in the packet core and on the macro base station scheduler. On the uplink, the base station sets the outer IP header of the ESP packets such that application of the UL-TFT by the backhaul modem maps different packets to different bearers and thus get relevant QoS up to and through reaching the BH-PGW. Where used herein, "backhaul" as an adjective refers to the core network and network elements in the network used for providing backhaul to the base station, which may be a different network than is used for managing the base station or anchoring UEs attached to the base station.

The telecommunications network operator is responsible for planning the QCI mapping: i.e. how do the UE QCIs for the LTE access network map to the backhaul UE QCIs on the backhaul/transit LTE network. It could be 1:1 (every QCI on the access gets the same QCI on the transit network) or N:M (e.g. VOIP and Video QCIs on access share the VOIP QCI on backhaul, as shown in the diagram). Additionally, the QCI used for base station-coordinating node signaling and other infrastructure traffic may be determined by the operator.

The backhaul LTE operator would then need to configure the backhaul PGW with either static or dynamic rules to allow creation of multiple dedicated bearers on the backhaul modem. In the example above, the backhaul PGW is configured to establish two dedicated bearers: QCI 1 and QCI 5, when a UE connects with a special backhaul APN. The backhaul EPC network could specify either DSCP based, IP address based, SPI based or a combination of these as DL and UL TFTs for these dedicated bearers. The coordinating node and the base station are then configured to emit ESP packets that would match these TFTs and thus choose corresponding backhaul bearer and QoS.

In some embodiments, changing GBR of a dedicated bearer on the fly is contemplated. It is a possibility to change the GBR of the dedicated bearer (EPS for LTE-BH modem) on the fly, depending on the number of active PTT-users. When requesting a modification of bearer resources for a traffic flow aggregate or a modification of a traffic flow aggregate, the backhaul UE can modify the existing GBR. To request a change of the GBR without changing the packet filter(s), the UE shall set the TFT operation code in the Traffic flow aggregate IE to "no TFT operation" and include the packet filter identifier(s) to which the change of the GBR applies in the Packet filter identifier parameter in the parameters list. The UE shall indicate the new GBR requested for the EPS bearer context in the Required traffic flow QoS IE.

In some embodiments, the network may be configured as follows. Both a dedicated and a default bearer may be set up for the mobile base station's backhaul link. Carrier configures a separate APN, with one QCI 9 (default) & one QCI 1/QCI 6 (dedicated) bearers; or carrier configures a user profile, carrier PCRF should trigger the dedicated bearer (QCI 1/QCI 6) in the CCA-I, so that dedicated bearer can be initiated using piggyback/unsolicited option. Traffic for default bearer will be carried through QCI 9 bearer. Traffic for dedicated bearer will be carried through QCI 1/QCI 6 bearer. During all the HO procedures these bearers will be maintained. We need to apply different DSCP (TOS) based TFT for dedicated/default bearer. This needs to be supported by carrier's PGW & PCRF.

Additionally, in some embodiments, Carrier-PCRF needs to map police-PTT-App traffic to the following LTE QoS Classes: QCI=1 (or 6); DSCP=EF. During all the HO procedures these bearers will be maintained. Different DSCP (TOS) based TFT may be applied for dedicated/default bearer, which may be specially supported by carrier's PGW & PCRF. The required throughput for the GBR bearer depends on the number of concurrent UE voice connections, with 0.5 Mbps being a good rule of thumb for 32 concurrent UE voice connections.

Three specific proposed QCI and bearer mappings are proposed below.

Proposal #1: Some embodiments can provide QOS by establishing a Dedicated Bearer with Non-GBR (QCI=6) & ARP=1; with preemption Support Enabled via eNB. During traffic congestion, assuming the eNB (Macro) selects services to be preempted in the following sequence: ARP=15, ARP=14, . . . , ARP=2. In this way, as long as the total amount of resource consumed by all ARP=1 UEs is less than the total BW provided by eNB, the resource required by ARP=1 UEs can be guaranteed via preempting lower ARP classes.

Proposal #2: Some embodiments can provide QOS by establishing a Dedicated Bearer with GBR (QCI=1) & ARP=6, with Preemption Support Enabled via eNB. During traffic congestion, assuming the eNB (Macro) selects services to be preempted in the following sequence: ARP=15, ARP=14, . . . , ARP=7. In this way, only all ARP=7 & above UEs could be preempted during congestion, the resource required by QCI=1 UEs can be guaranteed via GBR.

Proposal #3: Some embodiments can provide QOS by establishing a Dedicated Bearer with GBR (QCI=1) & ARP=1, with preemption Support Enabled via eNB During traffic congestion, assuming the eNB (Macro) selects services to be preempted in the following sequence: ARP=15, ARP=14, . . . , ARP=2. In this way, all ARP=2 & above UEs could be preempted during congestion, the resource required by QCI=1 UEs can be guaranteed via GBR.

3. TFT Mapping

Traffic filter templates (TFTs) are IP filtering templates that are applied to bearer IP traffic. ToS can be a filter condition in TFT of bearers. In some embodiments, particular services may trigger dedicated bearer setup, with particular QCI or TOS applied to the bearers. Based on TOS, the bearer may be a dedicated bearer. However, in some cases, such a PCRF may not be available for using ToS to trigger the dedicated bearer setup. TFTs may cause an IP packet to be rewritten to add or remove TOS, DSCP, or other envelope information.

More specifically, a TFT (Traffic Flow Template) is a classifier that matches on fields on the inner IP of a GTP-U tunnel. A dedicated bearer (or secondary PDP context) is created, and traffic is forced to match it. Operators can create bearers or PDP contexts dynamically using Gx, in which traffic matching the TFT filters into the context based on rules in the PCEF, or having dynamic bearer/PDP creation done by the packet gateway itself based on traffic matching with pre-provisioned values. This can be useful if an upstream device on SGi will mark packets matching certain conditions with DSCP. The TFT selects which PDP context is used, and the QCI label is a short-hand for the QoS parameters within the context. The LTE version of the standards allows up to nine TFTs to be used per bearer. In prior revisions, there is only one TFT allowed, which is important to note if QoS handoff between HSPA and LTE, or LTE and CDMA is needed.

In some embodiments, a TFT may be created or used based on IP envelope information, such as type of service (TOS) or DSCP. In some embodiments, TFTs may be created or used based on source IP address or port. In some embodiments, TFTs may be created or used based on some combination of source address, subnet mask, IP protocol number (TCP, UDP), destination port range, source port range, IPsec security parameter index (SPI), type of service (TOS) (IPv4), or flow label (IPv6), or some combination of the above.

Type of service (TOS) is a field in the IPv4 header and is specified by various IETF RFCs, e.g., RFC 791, RFC 1122, RFC 1349, RFC 2474, and RFC 3168, each hereby incorporated by reference. The modern redefinition of the ToS field is a six-bit Differentiated Services Code Point (DSCP) field (specified by RFC 3260, hereby incorporated by reference) and a two-bit Explicit Congestion Notification (ECN) field. Various telecommunications operators use some combination of the above.

TFTs for uplink traffic may be applied as follows, in some embodiments. For uplink traffic, a bearer with QCI is received at PGW; the PGW applies a mapping from QCI to DSCP; and the PGW transmits packets onto IP network with DSCP control. The mapping from QCI to DSCP may involve a TFT. The mapping from QCI may involve a TFT to map the QCI to, e.g., source address, subnet mask, IP protocol number (TCP, UDP), destination port range, source port range, IPsec security parameter index (SPI), type of service (TOS) (IPv4), or flow label (IPv6), or some combination of the above. VoLTE (QCI-1) and all other GBR QCIs (2-4) may be supported.

TFTs for downlink traffic may be applied as follows, in some embodiments. An IP flow arrives at PGW with DSCP or TOS tagging. The PGW maps DSCP or TOS to a TFT. If DSCP or TOS mapping capability is not available, use source IP address or subnet. In some embodiments, to facilitate the use of multiple QCIs, IP packets may be rewritten at the coordinating gateway or one of the PGWs to set each IP flow to have a source address from a different subnet. This allows the destination network to use TFT packet filters to map each IP flow to a different QCI and bearer. In some embodiments, by advertising different endpoints for packet flows with differing quality of service requirements, different QCIs and different bearers may be used for the IP flows. The application of TFT filters results in a designated bearer and QCI value for each incoming IP flow.

In some embodiments, either IPv4, IPv6, or a mixture could be used in the core network(s) described. In some embodiments, TFTs may be created or distributed dynamically via a policy charging and rules function (PCRF).

In some embodiments, a packet filter component type identifier comprising one or more of: IPv4 remote address type; IPv6 remote address type; Protocol identifier/Next header type; Single local port type; Local port range type; Single remote port type; Remote port range type; Security parameter index type; Type of service/Traffic class type; Flow label type, or another parameter could be used to set up packet filters to examine one or more parameters, as shown below in TABLE 2. A port range could be a single port.

TABLE 2

| Bits (87654321) | Packet filter component type identifier |
|---|---|
| 00010000 | IPv4 remote address type |
| 00100000 | IPv6 remote address type |
| 00110000 | Protocol identifier/Next header type |
| 01000000 | Single local port type |
| 01000001 | Local port range type |
| 01010000 | Single remote port type |
| 01010001 | Remote port range type |
| 01100000 | Security parameter index type |
| 01110000 | Type of service/Traffic class type |
| 10000000 | Flow label type |

Packet filtering into different bearers is based on TFTs. The TFTs use IP header information such as source and destination IP addresses and Transmission Control Protocol (TCP) port numbers to filter packets such as VoIP from web-browsing traffic, so that each can be sent down the respective bearers with appropriate QoS. An Uplink TFT (UL TFT) associated with each bearer in the UE filters IP packets to EPS bearers in the uplink direction. Since the enhanced base station is aware of types of traffic associated with each attached UE's bearers, an UL TFT may be applied that is appropriate for the received UE bearer before being passed into the backhaul UE's bearer(s), in some embodiments. A Downlink TFT (DL TFT) in the PGW is a similar set of downlink packet filters. For more information regarding TFTs, the reader is invited to review 3GPP TS 24.008, hereby incorporated by reference herein in its entirety.

Three specific examples of TFT are described below, although any IP envelope information could be used: IP address based TFT; TOS-based TFT; and DSCP-based TFT.

IP address based TFT. The coordinating node is configured with multiple ESP IPs. And a mapping of which outer ESP IP to use for which type of traffic. Including LTE UE traffic for different QCIs and other originated traffic (signaling, GRE for WMM-profile etc.). In the examples below in TABLE 3, many QCIs of access traffic map to 3 ESP-IPs and thus 3 QCIs in the transit network (because N:M QCI mapping is being used). Mapping is based on IP address, port, or both. We can ensure that we will send out QCI=1 GTP packets from a particular address, and so on.

TABLE 3

| Type of traffic | ESP IP for originated traffic | Matching DL-TFT on BH-PGW and UL-TFT on BH-UE | QCI of EPS bearer in the transit LTE network |
|---|---|---|---|
| Signalling (SCTP, SON) | IP1 | Remote-IPv4 = IP1, for bearer with QCI 5 | 5 |
| LTE UE traffic with QCI 5 | IP1 | Remote-IPv4 = IP1, for bearer with QCI 5 | 5 |
| LTE UE traffic with QCI 1 | IP2 | Remote-IPv4 = IP2, for bearer with QCI 1 | 1 |
| LTE UE traffic with QCI 2 | IP2 | Remote-IPv4 = IP2, for bearer with QCI 1 | 1 |
| WiFi WMM profile 'Voice' | IP2 | Remote-IPv4 = IP2, for bearer with QCI 1 | 1 |
| Everything else (UE traffic, non-critical base station-coordinating gateway traffic etc.) | IP3 | None. So uses default bearer | 9 |

TOS-based TFT. Additionally, IP TOS or DSCP may be used to assign TFT, which may be used to assign QCI. Different TOS or DSCP values may be mapped directly to the appropriate QCI. For example, voice IP traffic may be assigned a high TOS priority and could be assigned to QCI=1, conversational voice, and so on, based on the preference and configuration of the operator.

DSCP based TFT. The coordinating node and base station could be configured with a QCI-DSCP marking for LTE traffic. And DSCP marking for other classes of traffic (base station-coordinating node signaling, GRE for WMM-profile etc.). As shown in the examples below in TABLE 4, many QCIs of access traffic map to 3 DSCP values and thus 3 QCIs in the transit network (because N:M QCI mapping is being used).

TABLE 4

| Type of traffic | ESP DSCP to be marked by coordinating GW and enhanced base station | Matching DL-TFT on BH-PGW and UL-TFT on BH-UE | QCI of EPS bearer in the transit LTE network |
|---|---|---|---|
| Signalling (SCTP, SON) | AF31 | DSCP = AF31, for bearer with QCI 5 | 5 |
| LTE UE traffic with QCI 5 | AF31 | DSCP = AF31, for bearer with QCI 5 | 5 |
| LTE UE traffic with QCI 1 | EF | DSCP = EF for bearer with QCI 1 | 1 |
| LTE UE traffic with QCI 2 | EF | DSCP = EF, for bearer with QCI 1 | 1 |
| WiFi WMM profile 'Voice' | EF | DSCP = EF, for bearer with QCI 1 | 1 |
| Everything else (UE traffic, non-critical base station-coord. GW traffic etc.) | BE | None. So uses default bearer | 9 |

Figure 1:
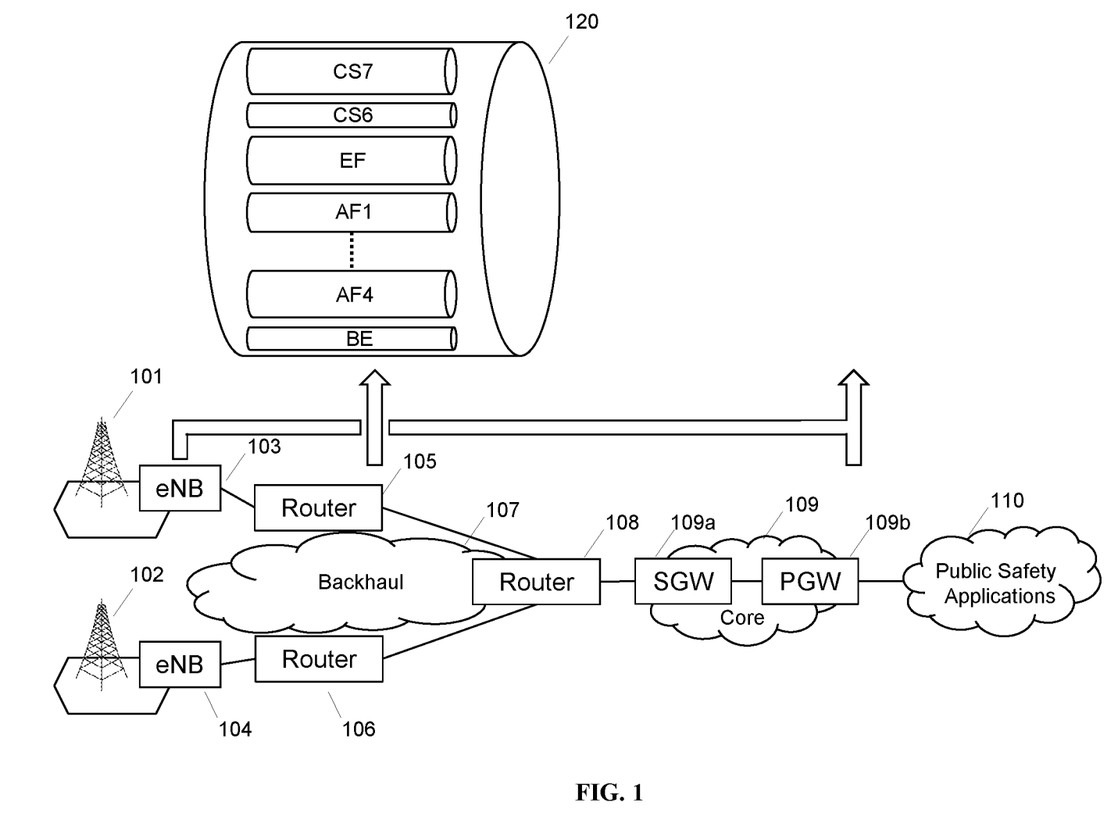
FIG. 1 is a schematic drawing depicting quality of service schemes in the prior art.

FIG. 1 is a schematic drawing depicting quality of service schemes in the prior art. Base stations 101/103 and 102/104 are coupled with routers 105/108, which pass through backhaul cloud 107 to router 108 and thereby pass data to the core network 109b. Core network 109b includes SGW 109a and PGW 109b. Public safety applications 110 are located on the far side of PGW gateway 109b, and must transit through the core network and the gateway without the benefit of prioritized service. Router 105 sends various packet flows 120 over the public Internet with various associated DSCP parameters (CS7, CS6, EF, AF1 . . . AF4, BE, etc.), which are routed according to DSCP priority rules; however, as shown, the data from public safety cloud 110 is not assigned any special priority, as the PGW 109b is not aware that it requires special treatment.

Figure 2:
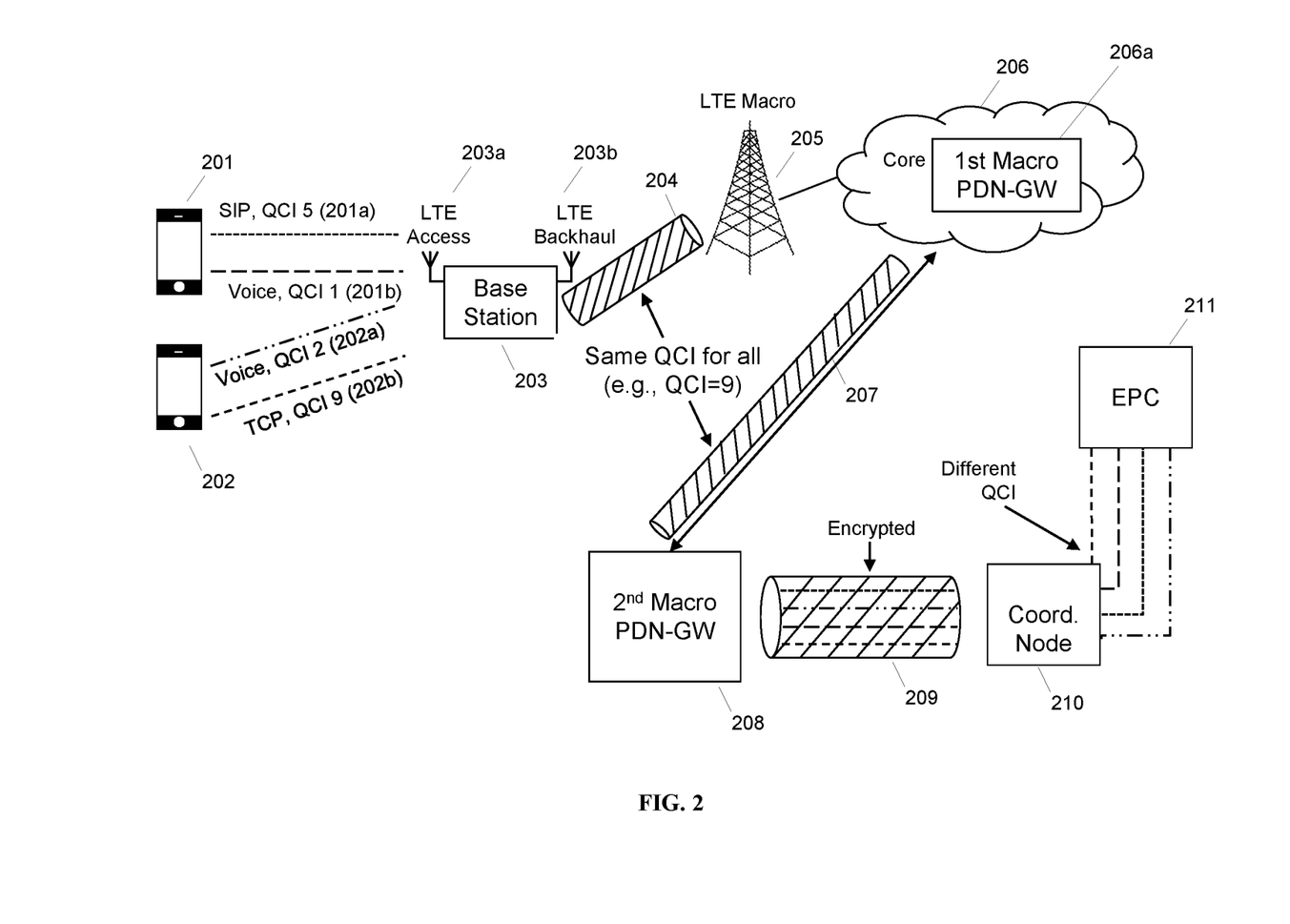
FIG. 2 is a schematic drawing depicting a quality of service scheme, in accordance with certain embodiments of the present disclosure.

FIG. 2 is a schematic drawing depicting a quality of service scheme, in accordance with certain embodiments of the present disclosure. UEs 201, 202 have multiple bearers, e.g., signaling bearer 201a (SIP), voice bearer 201b, voice bearer 202a, and regular TCP bearer 202b. Each of these bearers has a different QCI value. UEs 201 and 202 are attached to the LTE access side 203a of base station 203. Base station 203 also has an LTE backhaul module 203b, which is itself a UE and itself is attached to UE macro 205 via tunnel 204.

Tunnel 204 encapsulates bearers 201a, 201b, 202a, 202b to LTE macro 205 and thereby to core network 206, referred to in some instances herein as the first core network because of its proximity to the base station 203. The first core network is not the core network providing mobility and anchoring to UEs 201 and 202, but rather the core network being used for backhaul and anchoring the UE of LTE backhaul 203b. Core network 206 includes first macro packet data network gateway 206a, which is in communication with second macro packet data network gateway 208 via tunnel 207. Tunnel 204 and tunnel 207 are GTP tunnels and have a single QCI, resulting in a single QCI for all traffic. Note that tunnel 207 may pass through the Internet or another packet data network (not shown).

The second PDN-GW is part of a second core network, which also includes coordinating node 210. Data passes via encrypted tunnel 209 to coordinating node 210 (the encrypted tunnel is an IPsec tunnel terminated at base station 203 and coordinating node 210). Coordinating node 210 unpacks the bearers 201a, 201b, 202a, 202b and applies appropriate QCI treatment when it sends the data to EPC 211 (in the second core network), to permit UE 201 and UE 202 to connect to their own core network.

Figure 3:
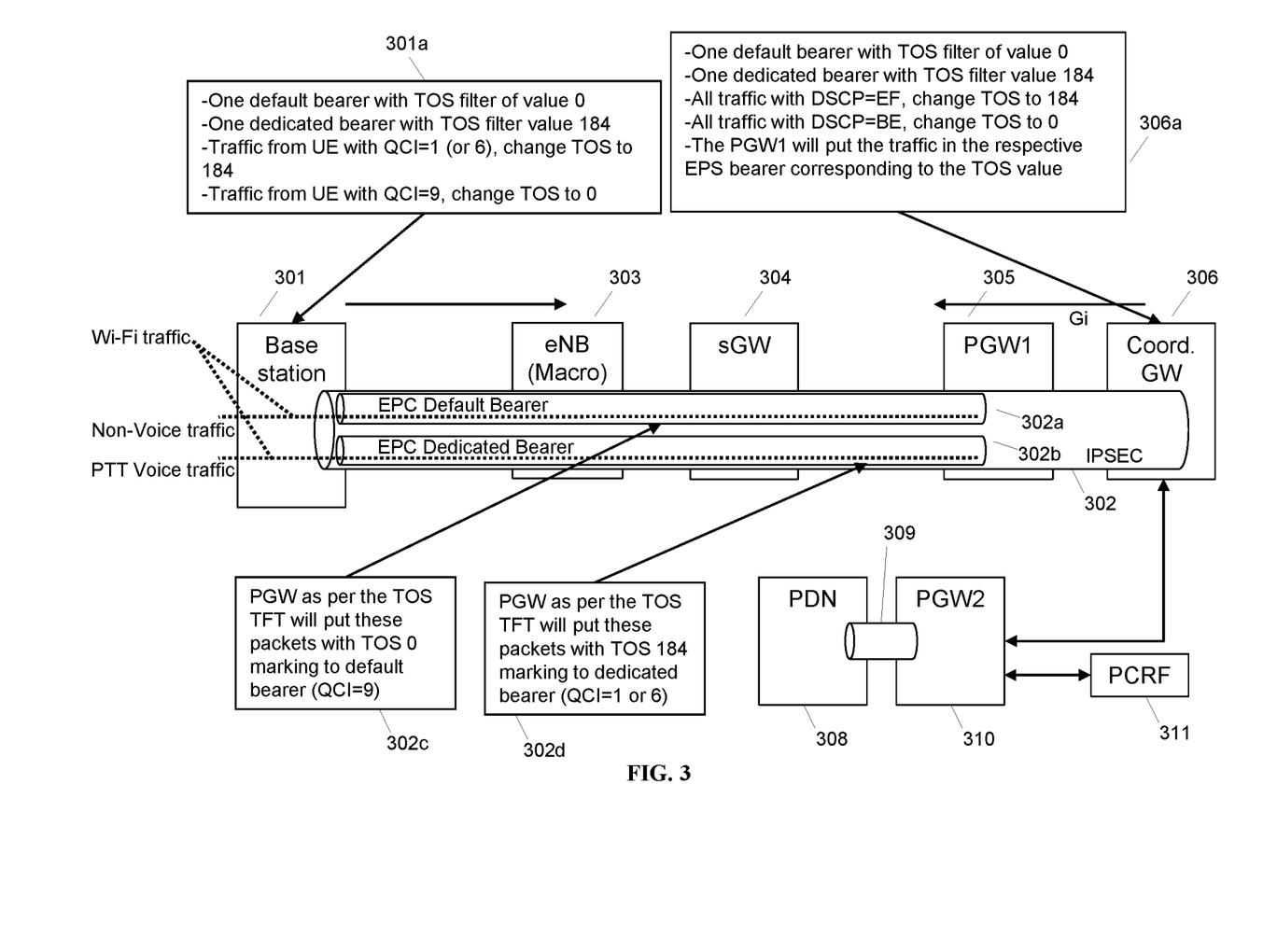
FIG. 3 is a further schematic drawing depicting a quality of service scheme, in accordance with certain embodiments.

FIG. 3 is a further schematic drawing depicting a quality of service scheme, including TFT filters, in accordance with certain embodiments. Base station 301 is in communication via IPsec tunnel 302 with coordinating gateway 308, via macro eNB 303, serving gateway 304, and PGW1 305. Coordinating gateway 308 is in communication with PGW2 310, and via PGW2, PDN 308 and PCRF 311 in the second core network. PCRF 311 serves QCI, ARP, and DSCP mappings for each UE in the second core network (i.e., the UEs, not shown) to coordinating gateway 306 and base station 301, via PGW2 310. As the UEs (not shown) are anchored in the second core network at PGW2 310, data from the public Internet or other packet data networks 308 may reach PGW2 310 via path 309 and may be directed to the UE via gateway 306, IPsec tunnel 302, and base station 301 before reaching the UEs (not shown).

Base station 301 provides access to one or more UEs (not shown). The user devices may include Wi-Fi devices. The user devices may generate traffic, including Wi-Fi traffic, non-voice traffic, and PTT voice traffic, and it is desirable to give priority to PTT voice traffic over non-voice traffic, and priority to public safety traffic over non-public safety traffic. Some subset of the user devices may be public safety devices, in some embodiments, entitled to a higher quality of service than ordinary user devices. The UEs (not shown) connected to base station 301 may establish bearers with a packet data network gateway PGW2 310. These bearers are not shown in the figure. Base station 301 has a backhaul UE, which attaches to eNodeB 303 and sets up a backhaul connection that includes EPC default bearer 302a and EPC dedicated bearer 302b with a packet data network gateway PGW1 305.

According to the configuration shown, base station 301 is configured with configuration 301a. One default bearer with a TOS TFT filter of value 0 is set up, and one dedicated bearer with TOS filter value 184 (decimal) is set up. TOS value 184 is a value with TOS precedence 5 and TOS precedence name Critical, equivalent to DSCP 48 (decimal) or DSCP class EF. All EF traffic is normally mapped to the priority queue in Cisco switches and routers, to provide resources to delay-sensitive real-time, interactive traffic (and improving packet loss, delay, and jitter). Of course, other values may be used, in some embodiments. All traffic from any UE with having a priority QCI (for example, QCI=1 or QCI=6) is filtered to have its TOS changed to 184. All traffic from any UE having a low priority QCI (for example, QCI=9) has its TOS changed to 0. Application of these filters causes priority data as identified by QCI to be placed on the dedicated bearer 302b, and non-priority data to be placed on default bearer 302a, each packet identified by a TOS value. When the traffic passes out the other end of the tunnel, no remapping is needed for routers to appropriately assign priority resources to the pre-tagged packets. Base station 301 may also perform admission control by determining whether to permit new UEs to attach based on how much traffic is mapped to the priority QCIs, and/or may use ARP for this purpose.

On the coordinating gateway side, as shown in configuration 306a, parallel rules are put into place such that the default bearer is associated with a TOS value of 0 and the dedicated bearer with a TOS value of 184. As the coordinating gateway receives non-3GPP data, all incoming traffic with DSCP value of EF has its TOS set to 184, and all incoming traffic with DSCP=BE has its TOS changed to 0. The PGW1 305 will then put the traffic in the respective EPS bearer corresponding to the TOS value.

In operation, at step 302c, the PGW1 305 will put packets with TOS=0 into the default bearer, which is handled with QCI=9, according to an installed TFT at the PGW. At step 302d, packets with TOS 184 will be placed in the dedicated bearer and treated with a high priority QCI, e.g., QCI=1 or QCI=6, according to the convention decided upon by the operator.

Filters can be stacked (i.e., multiple filters may be installed), in some embodiments. Filters may be matched between the eNodeB and the coordinating node, in some embodiments. Filters may be configured to dynamically or programmatically assign QCIs, and filters need not be flat N:M mappings; instead they may cause the execution of code when matched. Filters may assign or associate traffic to bearers with certain ARP parameters, for example, effectively designating certain traffic as preemptable.

As shown, the use of TFT filters requires coordination among the coordinating node, the eNodeB, the PGWs and other nodes in the network such as the PCRF and the HSS. Filters may be installed or configured based on other available information. For example, in certain cases DSCP or TOS based tagging may not be available, due to equipment not supporting interpretation of these parameters. In such cases an operator may use any of the other network information available. A particular example, in some embodiments, would be the use of network source or destination addresses such as IPv4 or IPv6 addresses, and/or IP ports. Certain protocols, such as SIP or RTP, often use particular ports, and in the case of internal applications where phone calls are made between network nodes with known addresses, IP addresses may be known; filters that match such known envelope information could be used to assign bearers and QCI values as shown in FIG. 3. Any envelope information could be used. In some embodiments, source IP addresses may be rewritten by other network nodes to facilitate matching of filter rules by, e.g., the network nodes shown in FIG. 3. For example, all public safety communications may be intercepted by a gateway and rewritten to come from a particular IP subnet, which could then be used for filtering.

Figure 4:
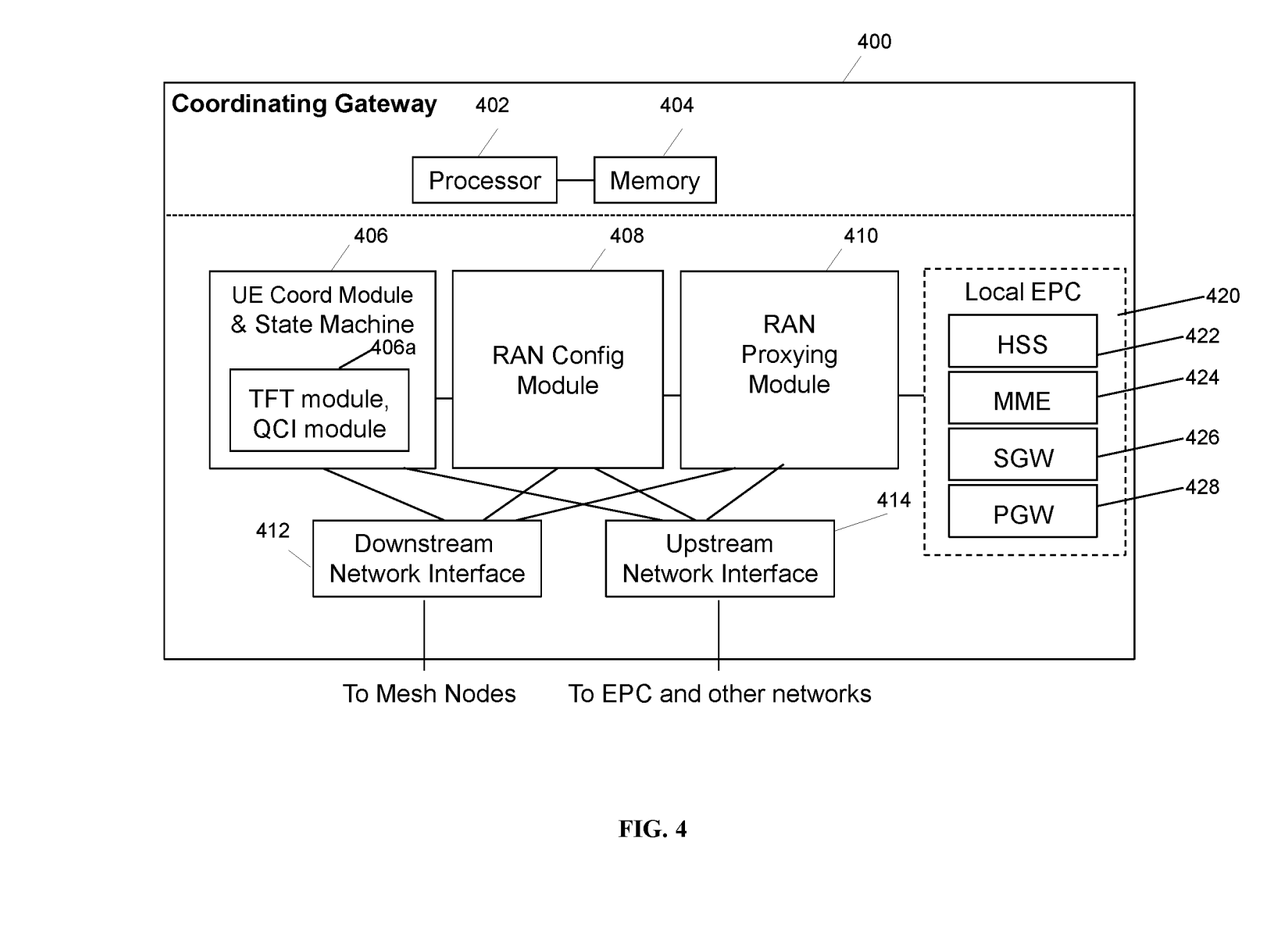
FIG. 4 is a schematic diagram of a coordinating gateway, in accordance with certain embodiments.
Figure 6:
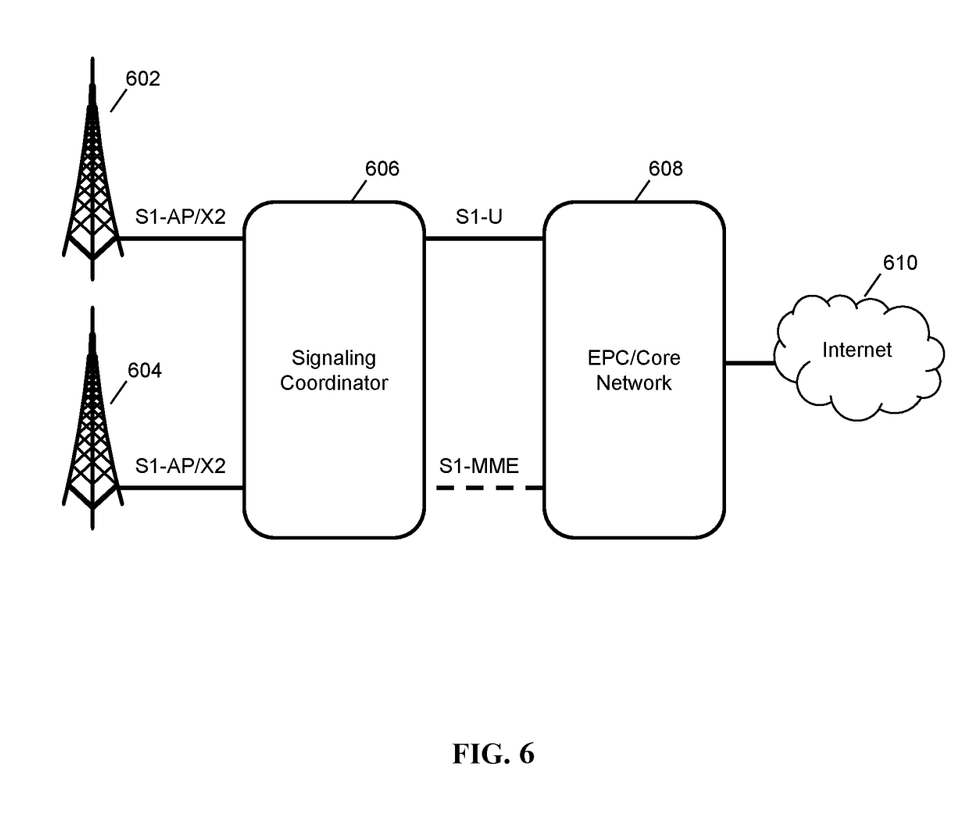
FIG. 6 is a system architecture diagram of an exemplary network configuration, in accordance with some embodiments.

FIG. 4 is a schematic diagram of a coordinating node, in accordance with some embodiments. Coordinating node 400 includes processor 402 and memory 404, which are configured to provide the functions described herein. Also present are UE coordination module and state machine 406, RAN configuration module 408, and RAN proxying 410. UE coordination module 406, and in particular TFT module/QCI module 406a, may perform the functions described herein for QOS management, including matching incoming traffic to bearers using filters. RAN configuration module 408 may coordinate installed TFT filters across the network (e.g., at eNodeBs) with TFT module 406a. In some embodiments, coordination server may also provide proxying, routing virtualization and RAN virtualization, via module 410. In some embodiments, a downstream network interface 412 is provided for interfacing with the RANs, which may be a radio interface (e.g., LTE), and an upstream network interface 414 is provided for interfacing with the core network, which may be either a radio interface (e.g., LTE) or a wired interface (e.g., Ethernet). Signaling storm reduction functions may be performed in module 406. The coordinating node may be located in the network as shown in FIG. 6 as signaling coordinator 606.

Coordinating node 400 includes local evolved packet core (EPC) module 420, for authenticating users, storing and caching priority profile information, and performing other EPC-dependent functions when no backhaul link is available. Local EPC 420 may include local HSS 422, local MME 424, local SGW 426, and local PGW 428, as well as other modules. Local EPC 420 may incorporate these modules as software modules, processes, or containers. Local EPC 420 may alternatively incorporate these modules as a small number of monolithic software processes. Modules 406, 408, 410 and local EPC 420 may each run on processor 402 or on another processor, or may be located within another device.

In some embodiments, the gateway of FIG. 4 may be a virtualized radio access network or may provide virtual network functions (VNFs). For example, the gateway of FIG. 4 may be equipped and provisioned to provide a cloud radio access network (CRAN) virtual network function (VNF), with real-time elastic scheduling, real-time X2 brokering, real-time self-organizing network (SON) capability with load balancing, mobile edge computing (MEC) capability, video traffic optimization, software defined networking (SDN) with unlicensed assisted backhaul and quality of experience (QoE) management. The VNFs provided on this gateway may be located at a particular hardware node or moved around in containers or virtual machines within a data center. The latency characteristics of the global scheduler described herein are flexible, as it is possible to provide helpful hints and hash keys for resources even with latencies of tens or hundreds of milliseconds. Therefore, the flexibility of a virtualized global scheduler is greater than that of a convention cloud radio access network (CRAN) infrastructure.

Figure 5:
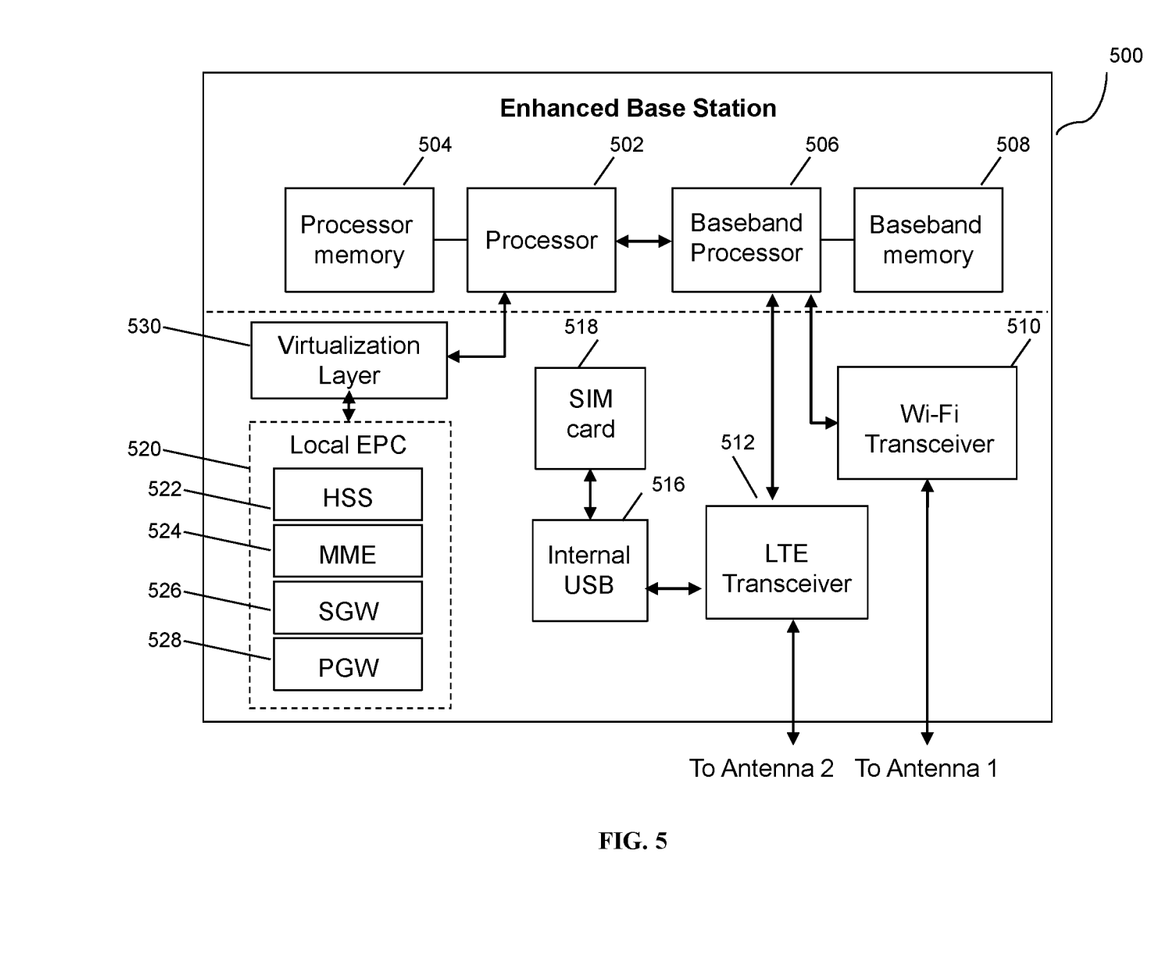
FIG. 5 is a schematic diagram of an enhanced base station, in accordance with certain embodiments.

FIG. 5 is a schematic diagram of an enhanced eNodeB, in accordance with some embodiments. Enhanced eNodeB 500 may include processor 502, processor memory 504 in communication with the processor, baseband processor 506, and baseband processor memory 508 in communication with the baseband processor. Enhanced eNodeB 500 may also include first radio transceiver 510 and second radio transceiver 512, internal universal serial bus (USB) port 516, and subscriber information module card (SIM card) 518 coupled to USB port 514. In some embodiments, the second radio transceiver 512 itself may be coupled to USB port 516, and communications from the baseband processor may be passed through USB port 516. Second transceiver 512 may be the backhaul UE described herein.

A scheduler 530 is shown, and may perform operations as described elsewhere herein. Specifically, scheduler 530 may receive communications from attached UEs, such as measurement reports, and ANR information from the eNB itself, and may forward them to a coordinating server (identified in FIG. 5 as "to global scheduler"). Scheduler 530 performs essential scheduling functions as required by the LTE standard, sending out scheduling information every 1 TTI for all UEs attached to eNodeB 500, but may incorporate hints or allocated resources via hash values received from the global scheduler at local scheduler 530. Local scheduler 530 may include a mapping to identify what resources have been allocated by reversing or otherwise interpreting the hashed hints and resource allocations received from the global scheduler.

The processor 502 may be in communication with a local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Scheduler 530 and local EPC 520 may each run on processor 502 or on another processor, or may be located within another device.

Processor 502 and baseband processor 506 are in communication with one another. Processor 502 may perform routing functions, and may determine if/when a switch in network configuration is needed. Baseband processor 506 may generate and receive radio signals for both radio transceivers 510 and 512, based on instructions from processor 502. In some embodiments, processors 502 and 506 may be on the same physical logic board. In other embodiments, they may be on separate logic boards.

The first radio transceiver 510 may be a radio transceiver capable of providing LTE eNodeB functionality, and may be capable of higher power and multi-channel OFDMA. The second radio transceiver 512 may be a radio transceiver capable of providing LTE UE functionality. Both transceivers 510 and 512 are capable of receiving and transmitting on one or more LTE bands. In some embodiments, either or both of transceivers 510 and 512 may be capable of providing both LTE eNodeB and LTE UE functionality. Transceiver 510 may be coupled to processor 502 via a Peripheral Component Interconnect-Express (PCI-E) bus, and/or via a daughtercard. As transceiver 512 is for providing LTE UE functionality, in effect emulating a user equipment, it may be connected via the same or different PCI-E bus, or by a USB bus, and may also be coupled to SIM card 518.

SIM card 518 may provide information required for authenticating the real or simulated UE to the evolved packet core (EPC). When no access to an operator EPC is available, local EPC 520 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 510 and 512, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 502 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 510 and 512. Baseband processor 506 may use memory 508 to perform these tasks.

FIG. 6 is a system architecture diagram of an exemplary network configuration, in accordance with some embodiments. Base stations 602 and 604 are connected via an S1-AP and an X2 interface to coordination server 606. Base stations 602 and 604 are eNodeBs, in some embodiments. Coordination server 606 is connected to the evolved packet core (EPC)/Core Network 608 via an S1 protocol connection and an S1-MME protocol connection. Coordination of base stations 602 and 604 may be performed at the coordination server. Also, as described elsewhere herein, the base stations 602 and 604 transmit all data through an encrypted IPsec tunnel to the coordination server 606, and the coordination server 606 acts as a gateway for the base stations to access the core network. This architecture enhances the ability of the coordination server to participate in both the control plane and data plane interactions of the eNodeBs, and to simultaneously manage the core network's interactions with the base stations. In some embodiments, the coordination server may be located within the EPC/Core Network 608.

EPC/Core Network 608 provides various LTE core network functions, such as authentication, data routing, charging, and other functions. In some embodiments, mobility management is performed both by coordination server 606 and within the EPC/Core Network 608. EPC/Core Network 608 provides, typically through a PGW functionality, a connection to the public Internet 610. As shown in the figure, coordination server 606 is in both the data plane path and the control plane path between the base stations and the core network, and derives advantages from this position, including the ability to virtualize the base stations and control scheduling by communicating directly with the (non-virtualized) base stations.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, including FDD and TDD in different bands, the base stations may also support other air interfaces, such as UMTS/HSPA, CDMA/CDMA2000, GSM/EDGE, GPRS, EVDO, other 3G/2G, legacy TDD, or other air interfaces used for mobile telephony. The inventors have appreciated that the systems and methods disclosed herein are suitable for use with 3G as well as 4G and LTE applications, as, e.g., PDP contexts have many of the same characteristics as LTE bearers and as tunneled backhaul may be used for 3G as well as 4G. 5G may also be supported accordingly, as well as new versions of DSCP, TOS, QCI, etc. using the disclosed systems and methods. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever TOS or DSCP are mentioned, other network data packet envelope identifiers can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary. Although many of the examples described herein describe the use of this technique with an LTE network, the technique described herein may be used in a cellular network, an ad-hoc cellular network or other ad-hoc network, a Wi-Fi or microwave mesh network, or various other types of networks that require coordination and control, as would be understood by one of skill in the art.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order. Features of one embodiment may be used in another embodiment. Other embodiments are within the following claims.

The invention claimed is:

1. A method, comprising:
establishing, in a multi Radio Access Technology (RAT) network, a first backhaul bearer at a base station with a first core network, the first backhaul bearer established by a backhaul user equipment (UE) at the base station, the first backhaul bearer having a single priority parameter, the first backhaul bearer terminating at a first packet data network gateway in the first core network, the first backhaul bearer for carrying data from a plurality of UEs attached at the base station to the first core network;
establishing an encrypted internet protocol (IP) tunnel between the base station and a coordinating gateway in communication with the first core network and a second core network;
facilitating, for at least one UE attached at the base station, establishment of a plurality of UE data bearers encapsulated in the secure IP tunnel, the plurality of UE data bearers terminating at a second packet data network gateway in the second core network and having a plurality of individual priority parameters for prioritized traffic control at the second core network;
transmitting prioritized data of the plurality of UE data bearers via the first backhaul bearer and the coordinating gateway to the second core network; and
establishing a second backhaul bearer at the base station having a second priority parameter, where the first backhaul bearer is a dedicated bearer to be used for prioritized traffic, and the second backhaul bearer is a default bearer to be used for non-prioritized traffic.

2. The method of claim 1, wherein the first backhaul bearer is a dedicated bearer, the single priority parameter is a quality of service class indicator (QCI) parameter, and the plurality of individual priority parameters are each QCI parameters.

3. The method of claim 2, further comprising establishing the second backhaul bearer at the base station wherein the second priority parameter is a second QCI parameter.

4. The method of claim 1, wherein the first backhaul bearer is a dedicated non-guaranteed bit rate (non-GBR) bearer with an allocation retention priority (ARP) parameter.

5. The method of claim 1, wherein the first backhaul bearer is a dedicated non-guaranteed bit rate (non-GBR) bearer with a quality of service class identifier (QCI) parameter of 6 and an allocation retention priority (ARP) parameter of 1; wherein the first backhaul bearer is a GBR bearer with an ARP parameter of 6; or wherein the first backhaul bearer is a GBR bearer with an ARP parameter of 1.

6. The method of claim 1, where the first backhaul bearer is a guaranteed bit rate (GBR) bearer and the second backhaul bearer is a non-GBR bearer.

7. The method of claim 1, wherein the base station has a UE modem with an associated subscriber information module (SIM) card configured for use with the first core network.

8. The method of claim 1, further comprising:
receiving, at the coordinating gateway, uplink UE data from the UE on one of the plurality of UE data bearers;
identifying, at the coordinating gateway, a filter template for the uplink UE data based on a priority parameter associated with the one of the plurality of UE data bearers; and
applying, at the coordinating gateway, the filter template to the uplink UE data to create an IP flow with a quality of service parameter based on the priority parameter.

9. The method of claim 8, wherein the priority parameter is a quality of service class identifier (QCI) and the priority parameter is one of a differentiated services code point (DSCP) or IPv4 type of service (TOS) IP envelope tag.

10. The method of claim 1, further comprising:
receiving, at the coordinating gateway, a downlink IP flow from the second packet data network gateway (PGW);
identifying, at the coordinating gateway, a filter template to the downlink IP flow based on a parameter; and
applying, at the coordinating gateway, the filter template to the downlink IP flow to cause the downlink IP flow to be mapped to one of the plurality of UE data bearers as a selected UE data bearer with an associated quality of service class identifier (QCI).

11. The method of claim 10, wherein the filter template is a traffic filter template (TFT).

12. The method of claim 10, wherein the downlink IP flow is tagged with differentiated services code point (DSCP) or IPv4 type of service (TOS) tagging, and wherein the DSCP or TOS tagging is the parameter.

13. The method of claim 10, wherein the parameter is one or more of a source or destination IP address, a protocol identifier, a local or remote port range, or an IP packet envelope field.

14. The method of claim 10, wherein the selected UE data bearer is a dedicated bearer or a default bearer.

15. The method of claim 10, wherein the selected UE data bearer is a guaranteed bit rate (GBR) bearer or a non-GBR bearer.

16. The method of claim 10, wherein the selected UE data bearer is further characterized by an associated allocation retention priority (ARP) parameter.

17. The method of claim 10, wherein the downlink IP flow is a conversational voice IP flow, and wherein the associated QCI of the selected UE data bearer is 1.

18. The method of claim 10, wherein the downlink IP flow is a mission critical data flow, and wherein the associated QCI of the selected UE data bearer is 65 or 69.

\* \* \* \* \*